UNITED STATES PATENT OFFICE.

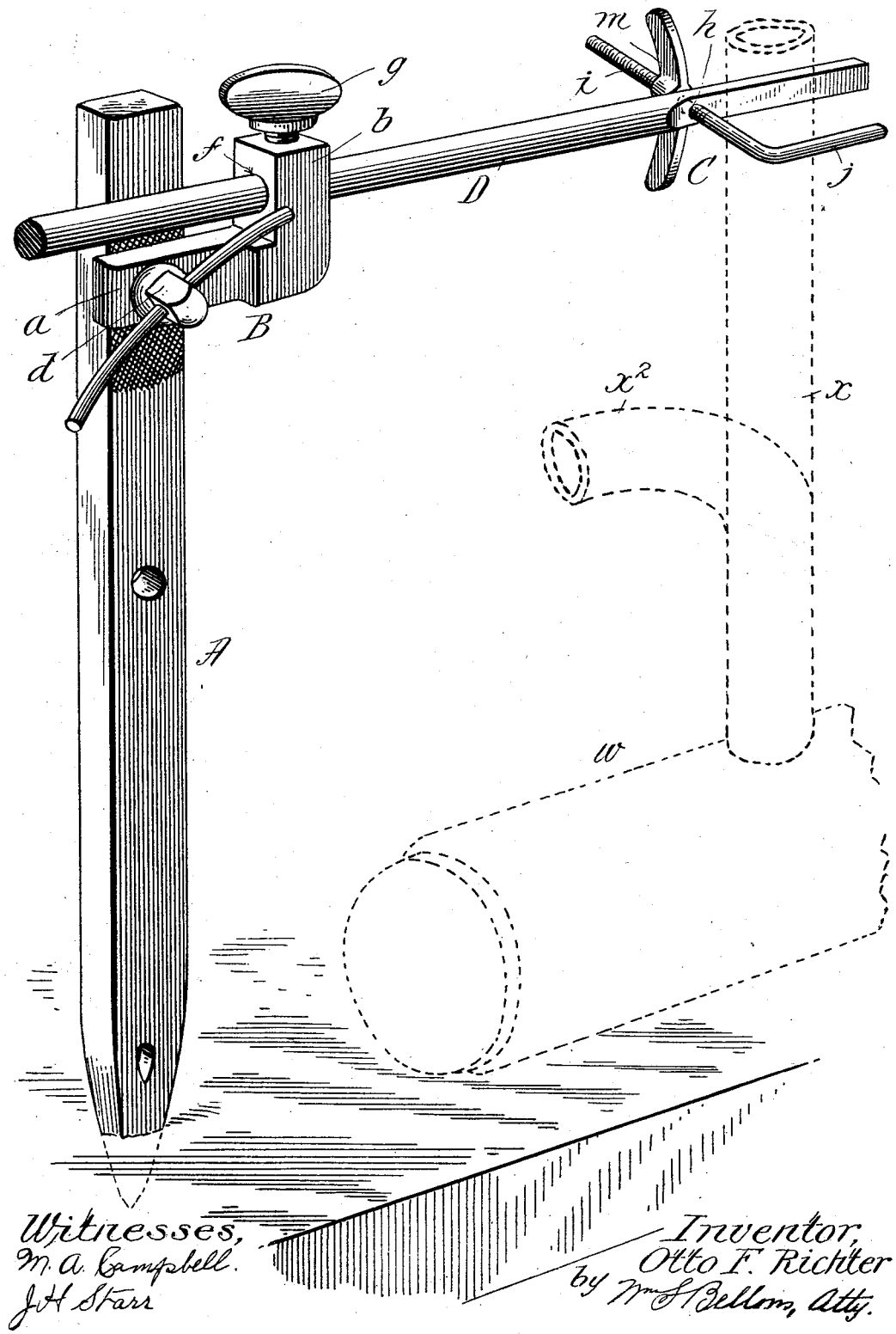

OTTO F. RICHTER, OF HOLYOKE, MASSACHUSETTS.

BRANCH-PIPE-HOLDING DEVICE FOR PLUMBERS' USE.

SPECIFICATION forming part of Letters Patent No. 605,613, dated June 14, 1898.

Application filed November 26, 1897. Serial No. 659,771. (No model.)

*To all whom it may concern:*

Be it known that I, OTTO F. RICHTER, a citizen of the United States, and a resident of Holyoke, in the county of Hampden and State of Massachusetts, have invented certain new and useful Improvements in Branch-Pipe-Holding Devices for Plumbers' Use, of which the following is a specification.

This invention relates to an improved implement for plumbers' use for facilitating their work in the making of wipe-joints—such, for instance, as for connecting a lead pipe branch with a trap—the implement being for the purpose of holding the branch or pipe with its end in juxtaposition near or against the side of the lead trap or part to which it is to be connected by a wipe-joint; and the invention consists in an implement for holding the branch part, the same having movably and adjustably mounted members to adapt it to various requirements in performing work of the class indicated, all as will hereinafter more fully appear, and be set forth in the claims.

Reference is to be had to the accompanying drawing, in which the improved implement is illustrated in a perspective view.

In the drawing, A represents a bar in the form of a spike, so that it may by its pointed end, while in a substantially upright position, be driven into the top of the bench or other work-support and serve as the stable upright support of and for the implement.

B represents an L-shaped arm consisting of the member $a$ and lug $b$. The member $a$ is by the shouldered binding-screw $d$ adapted to be confined in any inclination within the plane parallel with the front face of the spike, the same, when the clamp-screw is loosened, swinging on the latter as a pivot. The lug $b$ of the adjustable arm has a perforation $f$ therethrough in a line coincident with the plane of swinging movement of the arm B, through which the rod D is passed with a close sliding fit, the thumb-screw $g$ screwing into a tapped hole therefor in the lug, which intersects the perforation $f$, serving to hold the rod D in any endwise adjustment and also against any rotational or rolling movement.

The end portion of the rod D has the transverse perforation $h$, through which is passed the screw-threaded shank $i$ of the angular clamp member C, which is of L shape, its angular member $j$ having its position opposite and parallel with the end portion of the carrying-rod D.

The thumb-nut $m$ is applied on the screw-threaded shank of the L-shaped clamp C, bottoming against the side of the clamp-rod D and serving when turned to contract or permit to be widened the space between the binding member $j$ and the opposing end portion of the carrying-rod D, whereby pieces of pipe or trap branches of varying diameters may be received, clamped, and held supported.

The drawing shows the manner of use of the implement for holding a branch $x$ in an upright position, supporting it with its lower end next to the side of a cylindrical part, as a trap, to which the branch is to be connected by a wipe-joint. The main piece or trap (represented by $w$) being properly placed on the bench may be steadied by any suitable means, if any are deemed necessary beyond its own weight—as, for instance, by placing bars of solder or otherwise blocking it up. The plumber has now only to give care to the process of making the wipe-joint, not being hampered by any consideration necessary to the maintenance of the parts in their relations for being joined, and he may dispense with the assistance of a helper, as has been heretofore commonly necessary.

By loosening the clamp-screw $d$ the L-shaped arm B may be swung on the side of the spike-support, so that the clamp C of the device may have any desired height—that is, whereby the rod D may either extend in a horizontal line, about as shown, or away from the spike-support in an upward or a downward direction to accord with different conditions or requirements arising from the varying lengths of branches which are to be clamp-held and wipe-jointed into the main trap or appliance. If the branch part to be joined in is to be nearer the spike-support than shown, the rod D will be correspondingly moved through the lug $b$, after loosening the thumb-screw, the latter being, of course, again set up after the adjustment.

The branch $x$ instead of continuing straight up from the trap may have a right-angle bend, as represented at $x^2$ in the drawing, which may stand parallel to the length of the trap, and obviously in order to support the so-formed angular branch in the embrace of the clamp it is only necessary after adjusting the rod D for its proper distention to adjust the arm B to bring the clamp adjacent the part of the branch to be supported. Should this angular branch have an extension from the trap radially and then angularly in a direction across the length of the trap instead of parallel with it, it would be, in addition to the changes in the adjustments just above noted, necessary to rotate the rod D quarter-way round, so as to have the clamp C standing in a plane of embrace at right angles to the axis, the part being clamped, and without further description it may be seen how obliquely-extending branches may be bodily clamped and held in juxtaposition relative to the pot-trap or other fitting or appliance preparatory to and during the wipe-joint-forming operation.

When the implement is to be laid away in a tool-chest or is to be transported, it may have its parts very compactly folded together by swinging the member B down, so that the clamp-carrying rod ranges closely alongside the spike-support.

I claim—

1. A branch-pipe-holding device for plumbers, of the character described, consisting of a spike constituting an upright support, a member pivotally mounted and adjustably confined on the side of the support, having the perforation $f$ therethrough in a line coincident with the plane of swinging movement of the said adjustable member, the rod D having a supporting engagement, and endwise, and also rotational adjustments in and through said perforation, and a thumb-screw for confining the rod in its adjusted positions, and a clamp provided at the extremity of the said rod and means for widening and closing the clamp, substantially as and for the purposes set forth.

2. A branch-pipe-holding device for plumbers, of the character described, consisting of a spike-support A, the L-shaped member B pivotally mounted and adjustably confined on the side of the support, having the perforation $f$ through a member thereof in a line coincident with the plane of swinging movement of the said adjustable member, the round rod D having a supporting engagement, and endwise adjustment, in and through said perforation, and a thumb-screw for confining the rod in its endwise position, the L-shaped clamp C having its screw-threaded shank passed through a perforation $h$ which is transversely provided in the end portion of the rod D and the thumb-nut $m$ screwing on said shank and against the rod, all substantially as and for the purposes set forth.

In testimony that I claim the foregoing as my invention I have signed my name, in presence of two witnesses, this 20th day of November, 1897.

OTTO F. RICHTER.

Witnesses:
WM. S. BELLOWS,
M. A. CAMPBELL.